United States Patent [19]

Okada et al.

[11] Patent Number: 5,523,661
[45] Date of Patent: Jun. 4, 1996

[54] SHIFT LOCK ACTUATOR AND CONTROL CIRCUIT THEREFOR

[75] Inventors: Kazukiyo Okada, Kosai; Shigeki Okabe, Toyohashi, both of Japan

[73] Assignee: Asmo Co., Ltd., Kosai, Japan

[21] Appl. No.: 329,301

[22] Filed: Oct. 25, 1994

Related U.S. Application Data

[62] Division of Ser. No. 893,255, Jun. 3, 1992, abandoned.

[30] Foreign Application Priority Data

May 6, 1991 [JP] Japan ..................... 3-134186

[51] Int. Cl.⁶ ........................................ H02P 1/00
[52] U.S. Cl. .......................... 318/264; 318/626; 318/466; 318/468; 318/286
[58] Field of Search ...................... 318/626, 687, 318/466, 468, 286, 254, 138, 434; 70/275, 277; 200/43.11

[56] References Cited

U.S. PATENT DOCUMENTS

| | | | |
|---|---|---|---|
| 4,134,052 | 1/1979 | Wanlass et al. | 318/286 |
| 4,158,797 | 6/1979 | Alcott | 318/687 |
| 4,727,301 | 2/1988 | Fulks et al. | 318/466 |
| 4,926,707 | 5/1990 | Yamada | 74/96 |
| 5,355,068 | 10/1994 | Eckert, Jr. et al. | 318/254 |

FOREIGN PATENT DOCUMENTS

| | | |
|---|---|---|
| 63-148771 | 9/1988 | Japan . |
| 238146 | 2/1990 | Japan . |
| 4131557 | 5/1992 | Japan . |

Primary Examiner—William M. Shoop, Jr.
Assistant Examiner—Karen Masih
Attorney, Agent, or Firm—Stetina Brunda & Buyan

[57] ABSTRACT

An actuator for a locking mechanism which locks a shiftable lever in a locked position or a released position. The actuator includes a lock member which is shiftable between a locking position and an unlocking position for causing the lever to be locked in position or to be released from said locking position. A drive mechanism continuously forces the lock member toward said locking position. A drive mechanism causes a rotatable cam to rotate a predetermined distance in a preselected direction. The rotatable cam positions the lock member in the locking position or the unlocking position. The cam is specially designed to permit the lock member in the lock position, to be shifted to the unlocking position against the action of the drive mechanism. The drive mechanism includes a motor for rotating the cam in a predetermined direction, and a control circuit for controlling the power supply to a motor, in order to control the rotational phase angle of the cam.

17 Claims, 11 Drawing Sheets

5,523,661

SHIFT LOCK ACTUATOR AND CONTROL CIRCUIT THEREFOR

This application is a division, of application Ser. No. 07/893,255, filed Jun. 3, 1992 abandoned. This application claims the priority of Japanese Patent Application No. 3-134186 filed on Jun. 5, 1991 which is incorporated herein by reference.

BACKGROUND OF THE INVENTION

Field of the Invention

The present invention generally relates to an actuator for use in a locking mechanism. More particularly, this invention relates to a shift lock actuator for a shift lever in a vehicle automatic transmission mechanism, and to a drive control circuit.

Description of the Related Art

Locking actuators used in vehicles have several applications such as in the automatic transmission mechanism or doors. A conventional actuator includes a motor, a feed screw which in capable of rotating in the forward and backward, a nut which cooperates with the feed screw, a lock bar which is shiftable between a locking position and an unlocking position, and a control circuit for controlling the rotation of the motor.

This actuator however, requires a stopper for holding the lock bar in the locking position or the unlocking position, and a limit switch, for detecting the lock bar position. This conventional design renders the construction of the actuator more complicated, and increases its size. Furthermore, when the lock bar abuts the stopper, a sound is produced, and the stop position of the lock bar varies as a result of the bouncing reaction of the lock bar.

It has been a design objective to cause the shift lock actuator in an automatic transmission mechanism, more difficult to unlock in an emergency situation. Such a design would involve a complex mechanical structure and control circuit.

Because of the need to control the rotation of the motor, the conventional actuator requires a complex control circuit, similar to the one disclosed in the Japanese Unexamined Patent Publication No. 2-38146. In this control circuit, an output circuit supplies current to the motor, and includes a bridge circuit having four transistors. This bridge circuit complicates the control circuit, and increases the size of the shift lock actuator.

SUMMARY OF THE INVENTION

Accordingly, it is a primary object of the present invention to provide a simple structure design for a shift lock actuator.

It is another object of the present invention to provide a drive control circuit for the shift lock actuator. This control circuit has fewer components than a conventional control circuit, thus making it possible to design a more compact shift lock actuator.

The actuator is used with a locking mechanism which locks a shiftable lever in a locked position or in a released (unlocked) position. This actuator includes a lock member, a drive mechanism, a rotatable cam, and a drive mechanism for rotating the cam.

The lock member can be shifted between a locking position that sets the lever in an locked position, and an unlocking position that releases the lever. The drive mechanism forces the lock member toward a locking position. The rotatable cam positions the lock member in the locking position or the unlocking position. The cam also permits the lock member, which is set in the locking position, to move to the unlocking position under the action of an external force.

The drive mechanism includes a motor for rotating the cam in one direction, and a control circuit for controlling the power supply to the motor in order to control the rotational phase angle of the cam.

The control circuit controls the power supply to the motor, and includes a motor switch which permits energy to be supplied from the power source to the motor. A first controller permits the lever in the locking state to be released. A second controller permits the lever in the unlocking position to shift to the locking position. A third controller selectively controls the operation of the first and second controllers.

The first controller turns the motor switch on depending on the settings of the switches, and turns the motor switch off when the lever is shifted to the unlocking position. The second controller is capable of turning the motor switch on for a predetermined period of time, when the lever is in the unlocking position, and of turning the motor switch off upon shifting the lever to the locking position. The third controller prevents the action of the second controller when the first controller is enabled, and renders the second controller functional when the first controller is disabled.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIGS. 1 through 8 illustrate a first embodiment of the present invention of which:

FIG. 1 is a vertical cross section along the line X—X in FIG. 2, illustrating the interior of a shift lock actuator;

FIG. 2 is a horizontal cross section along the line Y—Y in FIG. 1;

FIG. 3 is a diagram illustrating a lock bar in a locking position;

FIG. 4 is a diagram illustrating the lock bar in an unlocking position;

FIG. 5 is a perspective view showing an eccentric cam portion of a worm wheel 16;

FIG. 6 is an electric circuit diagram of a drive control circuit according to the first embodiment;

FIG. 7 is an electric circuit diagram illustrating another example of a braking circuit; and FIG. 8 is a cross section exemplifying the shift lock actuator used in a locking mechanism of an automatic vehicle;

FIGS. 9 and 10 illustrate a second embodiment of the present invention of which:

FIG. 9 is an electric circuit diagram of a drive control circuit according to the second embodiment; and FIG. 10 is a diagram of another example of the electric circuit that uses a Darlington circuit instead of a transistor; and FIGS. 11 through 14 illustrate a third embodiment of the present invention of which:

FIG. 11 is a plan view showing the a cam according to the third embodiment:

FIGS. 12 and 13 are diagrams showing the activation states of the cam; and

FIG. 14 is a graph showing the relationship between the rotational angle of a worm wheel and the position of a lock bar.

DETAILED DESCRIPTION OF THE PREFERRED EMBODIMENTS

A first embodiment of the present invention, as embodied by a shift lock actuator for a gear shift lever in a vehicle automatic transmission mechanism will now be described in greater detail. A second and third embodiments will then be described in detail. The second embodiment illustrates a modification of the drive control circuit of the shift lock actuator, and the third embodiment exemplifies another mechanical structure of the shift lock actuator.

[First Embodiment]

Figure 1:
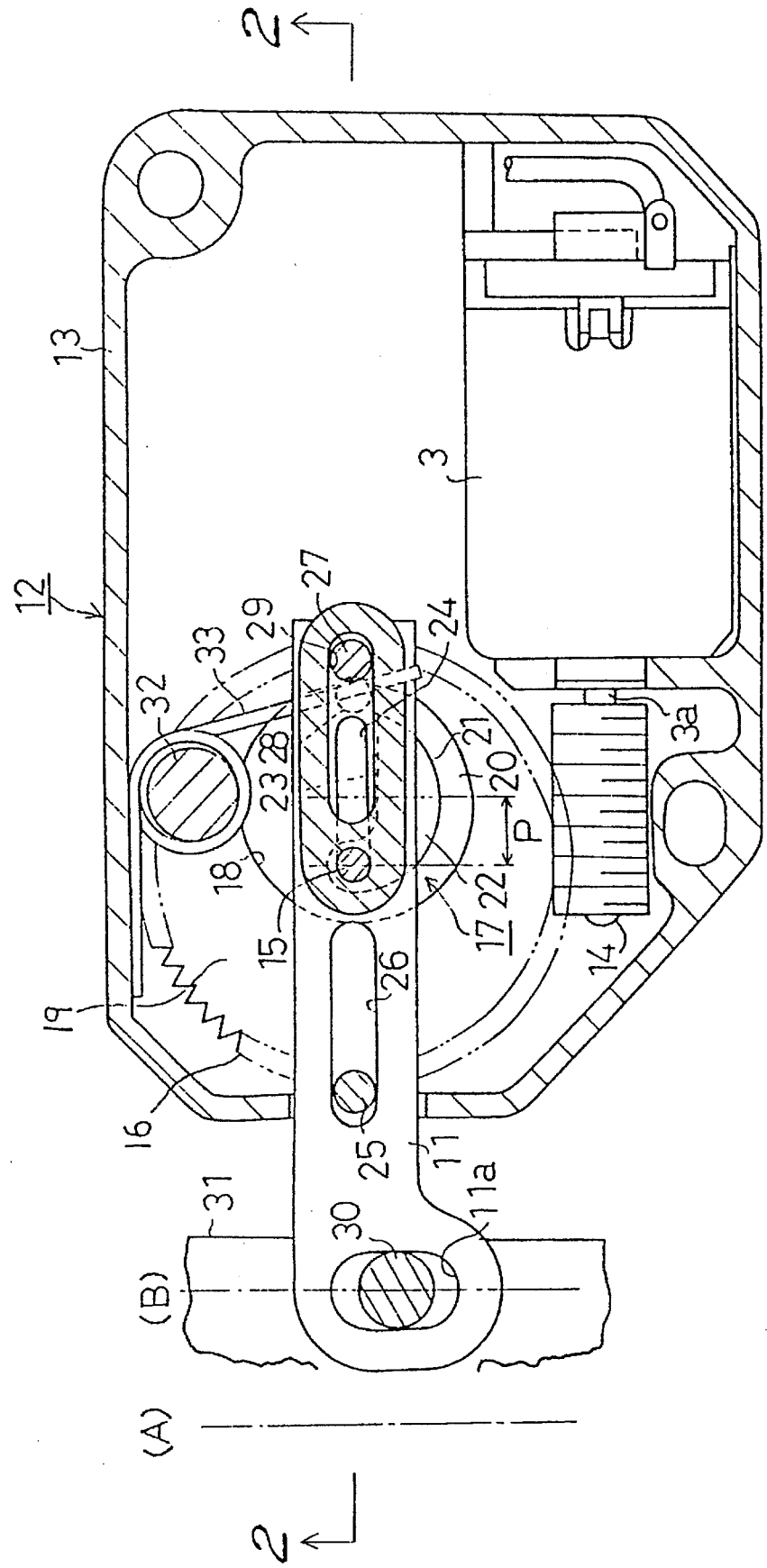

The first embodiment will now be described with reference to FIGS. 1 through 8, starting with the mechanical structure of a shift lock actuator 12. As shown in FIG. 1, a motor 3 is disposed in a casing 13. A worm like screw 14 is secured to a motor shaft 3a of the motor 3. A worm wheel 16 is supported rotatably in the casing 13, via a support shaft 15. The support shaft 15 is secured to the wheel 16. The worm wheel 16 rotates as the motor 3 is rotating, in cooperation with the worm screw 14.

Figure 5:
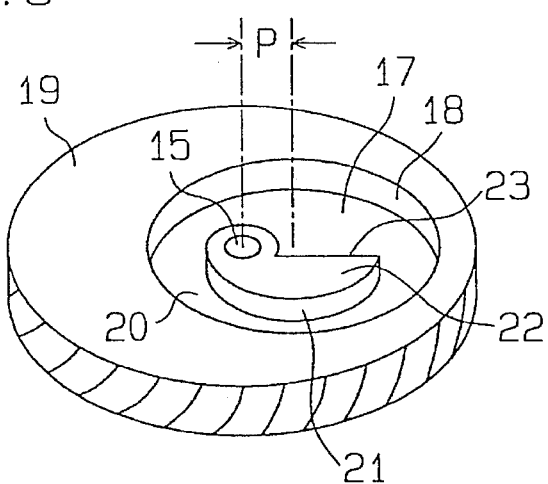

As shown in FIGS. 1 and 5, a positioning cam 17 is formed in a recess in a disc portion 19. The cam 17 has a cam portion 22 disposed on one side of the worm wheel 16. The disc portion 19 has a circular opening 18, which is eccentrically formed with respect to the geometrical center of the disc portion 19, and is separated therefrom by a distance P. The cam portion 22 has a curved generally semi-circular outer peripheral surface 21. The opening 18 and the outer peripheral surface 21 define a grooved recess 20.

The cam portion 22 has a flat outer peripheral surface 23 formed on the opposite side to the outer peripheral surface 21. This flat outer peripheral surface 23 is offset with respect to an central geometric axis passing through the center of the disc portion 19, by a distance generally equal to the diameter of a second pin 28. The pin 28 protrudes from a lock bar 11 which will be described later.

Figure 2:
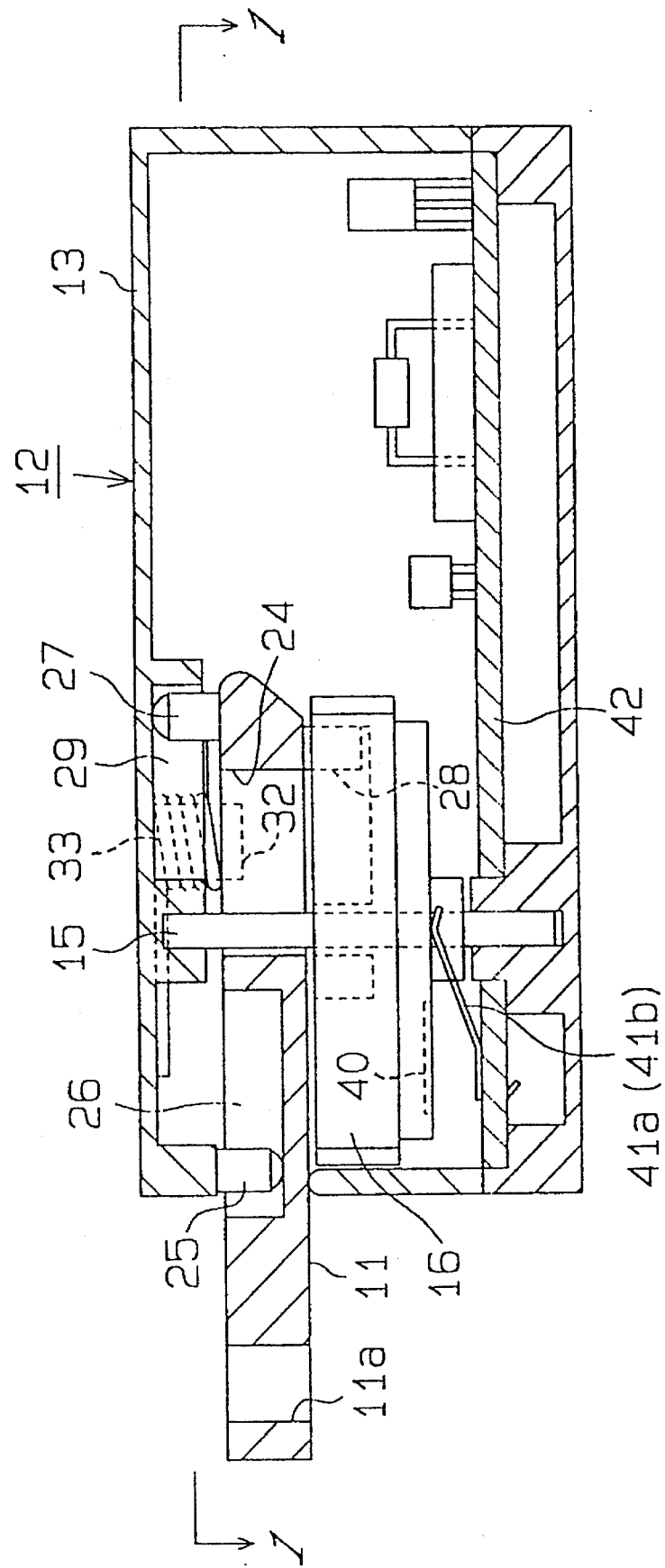
Figure 3:
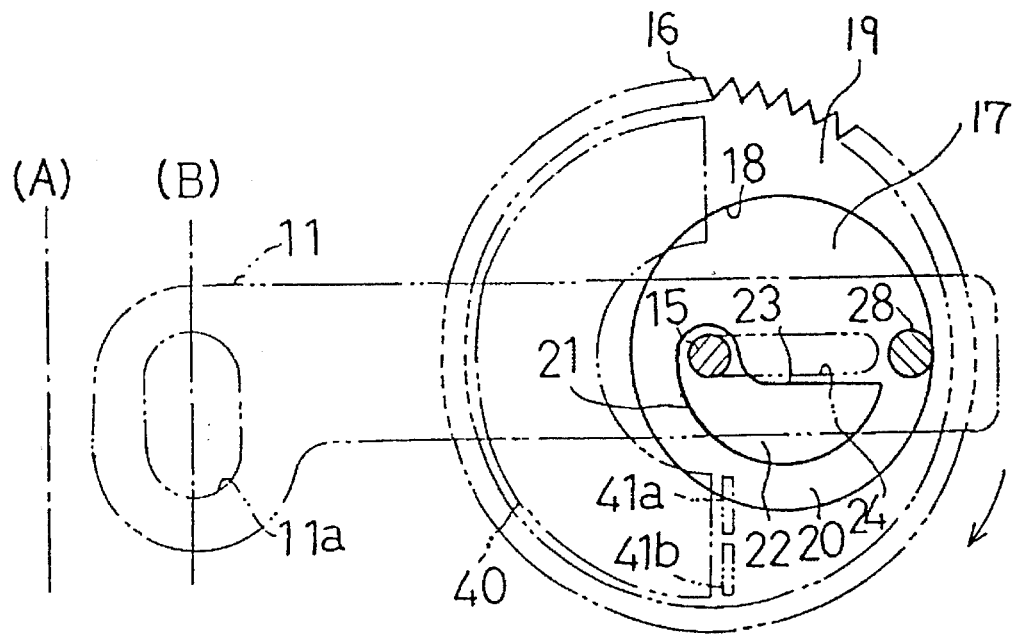
Figure 4:
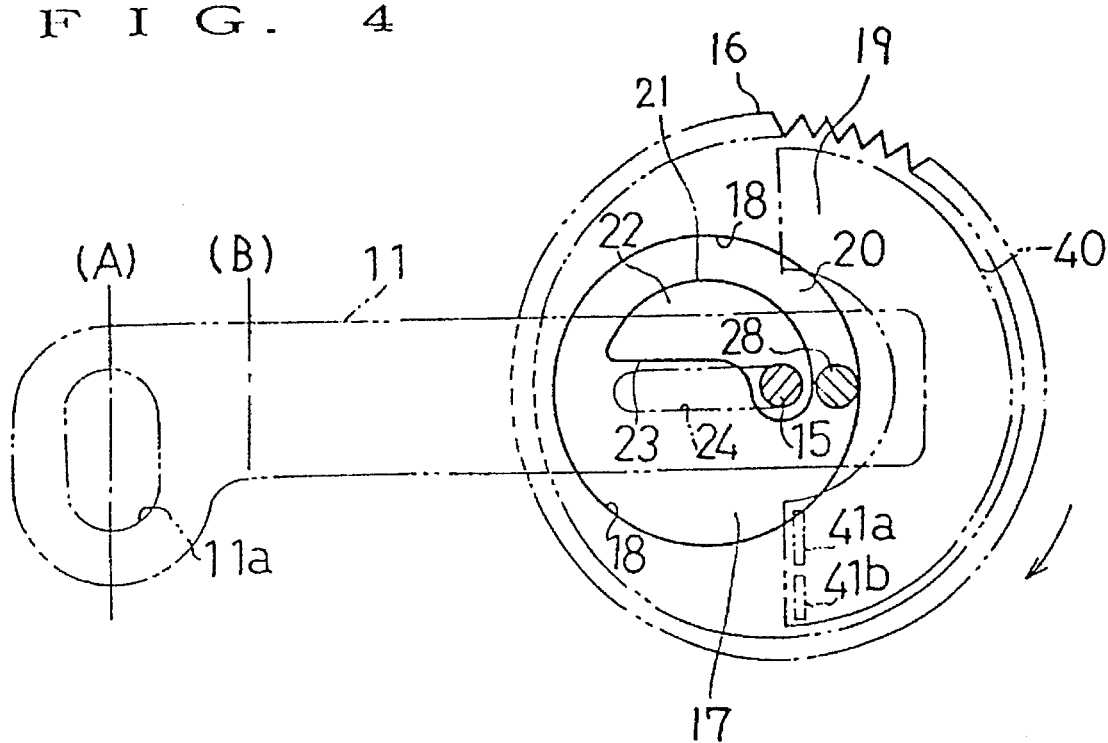

As shown in FIGS. 2, 3 and 4, a semicircular conductive plate 40 is secured to one side of the worm wheel 16, while the positioning cam 17 is positioned on the opposite side of the worm wheel 16. As shown in FIG. 2, a board 42 is disposed within the casing 13 and accommodates the electronic components of the control circuit the motor 3. A pair of contacts 41a and 41b are located on the board 42, and slidably contact the conductive plate 40. The contacts 41a and 41b contact the conductive plate 40 in relation with the rotation of the worm wheel 16. When both contacts 41a and 41b do not contact the conductive plate 40, the contacts 41a and 41b are non-conductive.

As shown in FIG. 1, the lock bar 11 is movably disposed along the length direction of the casing 13. The lock bar 11 has a proximal opening 24 through which the support shaft 15 passes, and an elongated recess 26 where a guide pin 25 on the casing 13 is fitted. The lock bar 11 also has a first pin 27 which projects forward. The second pin 28 projects rearward, such that both pins 27 and 28 are located at the proximal end of the lock bar 11. The first pin 27 is fitted within a guide recess 29 formed in the casing 13, and the second pin 28 engages the positioning cam 17.

The lock bar 11 has a distal opening 11a which extends outside the casing 13. A connector pin 30 is fitted in the distal opening 11a. The lock bar 11 is coupled via this connector pin 30 to a lock lever 31 which is connected to the gear shift lever.

The lock bar 11 moves forward and backward between an unlocking position A and a locking position B, depending on the engagement relationship between the positioning cam 17 and the second pin 28. More specifically, when the positioning cam 17 rotates 180° from the position shown in FIG. 3 with the rotation of the worm wheel 16, the distal end of the lock bar 11 is shifted to the unlocking position A (FIG. 4) from the locking position B (FIG. 3). The shifting of the lock bar 11 causes the lock lever 31 to move and to unlock the gear shift lever. At this time, the contacts 41a and 41b become conductive (FIG. 4).

As the worm wheel 16 makes another 180° rotation from the state shown in FIG. 4, the distal end of the lock bar 11 is shifted to the locking position B from the unlocking position A. The shifting of the lock bar 11 locks the gear shift lever. At this time, the contacts 41a and 41b become non-conductive (FIG. 3).

As shown in FIGS. 1 and 2, a projection 32 is provided on the upper end of the inner portion of the casing 13, with a torsional spring 33 fitted on the projection 32. The torsional spring 33 has one of its ends abutting against the casing 13, and the other end abutting against the first pin 27 of the lock bar 11. The torsional spring 33 therefore always tends to force the distal end of the lock bar 11 in the locking position B.

The motor 3 rotates the worm wheel 16 in only one direction, under the control of a drive control circuit 2. The time required to shift the lock bar 11 between the unlocking position A and the locking position B by rotating the worm wheel 16 is about 0.3 second.

The drive control circuit 2 for controlling the driving of the motor 3 will now be described in greater detail. In order to prevent an accident resulting from the erroneous manipulation of the gear shift lever at the time the vehicle starts moving, automatic transmission mechanisms have been designed to prevent the gear shift lever from shifting from the parking position to another position, until the driver steps on the brake pedal, and the lock release button on the gear shift lever is pressed. The present control circuit 2 is based on such a design concept.

Figure 6:
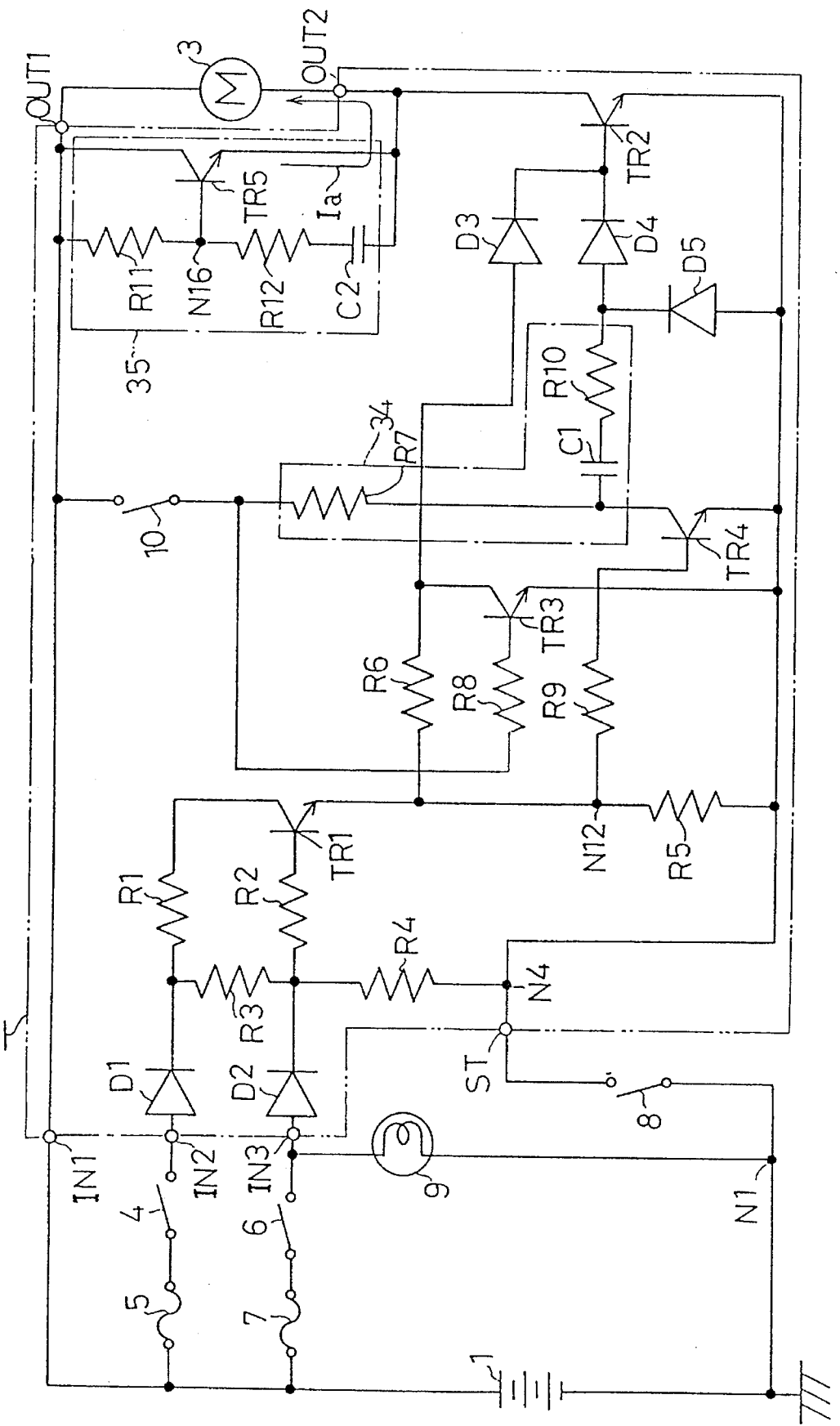

As shown in FIG. 6, a battery or power source 1 is connected, via the drive control circuit 2, to the motor 3. The drive control circuit 2 has three input terminals IN1, IN2 and IN3, two output terminals OUT1 and OUT2, and a ground terminal ST.

The input terminal IN1 is connected to the positive terminal of the power source 1. The input terminal IN2 is connected, via an ignition switch 4 and a fuse 5, to the positive terminal of the power source 1. The input terminal IN3 is connected, via a brake switch 6 and a fuse 7, to the positive terminal of the power source 1. The ground terminal ST is connected, via a parking switch 8, to the negative terminal of the power source 1. A brake light indicator 9 is connected between the input terminal IN3 and a node N1. By stepping on the brake pedal (not shown), the brake switch 6 is switched on, and the brake light indicator 9 is turned on. By shifting the gear shift lever to the parking position, the parking switch 8 is switched on.

The motor 3 is connected between the output terminals OUT1 and OUT2. The input terminal IN1 and the output terminal OUT1 are connected together, and the ground terminal ST is connected via a transistor TR2 to the output terminal OUT2. The input terminal IN2 is connected, via a diode D1 and a resistor R1, to the collector of the transistor TR1. The input terminal IN3 is connected, via a diode D2 and resistor R2, to the base of the transistor TR1. The emitter of the transistor TR1 is connected via a resistor R5 to the ground terminal ST.

The diode D1 and resistor R1 are connected to the diode D2 and resistor R2, via a resistor R3. The diode D2 and resistor R2 are connected via a resistor R4 to the ground terminal ST. The emitter of the transistor TR1 is also connected, via a resistor R6 and a diode D3, to the base of the transistor TR2. The resistor R6 and diode D3 are connected to the collector of a transistor TR3 whose emitter is connected to the ground terminal ST.

The input terminal IN1 is connected, via a detector switch 10 and a resistor R7, to the collector of a transistor TR4, whose emitter is connected to the ground terminal ST. The transistor TR4 has its base connected, via a resistor R9, to the emitter of the transistor TR1. A node between the detector switch 10 and the resistor R7 is connected, via a resistor R8, to the base of the transistor TR3.

The detector switch 10 includes the contact pair 41a and 41b and the conductive plate 40 shown in FIGS. 3 and 4. The detector switch 10 is switched on as both contacts 41a and 41b contact the conductive plate 40, and is switched off when the contacts 41a and 41b do not contact the conductive plate 40. In other words, the detector switch 10 is switched on when the lock bar 11 is in the unlocking position A, and is switched off when the lock bar 11 is in the locking position B.

The first control means is formed by the transistors TR1 and TR3, and functions as a switch to turn transistor TR2 off when the lock bar 11 reaches the unlock position. The second control means is formed by the differentiating circuit 34 and includes capacitor C1. Capacitor C1 permits current to flow through the second control means for a predetermined period of time. Thus, second control means controls the timed dependent switching of transistor TR2, and also turns transistor TR2 off when the lock bar 11 reaches the locking position. The third control means comprises rotary switch 10 and transistor TR4 and controls the first and second control means such that the rotary switch 10 disables the operation of the second control means when the first control means is deactivated and enables the operation of the second control means when the first control means is deactivated.

As shown in FIG. 6, the resistor R7 and the collector of the transistor TR4 are connected, via a capacitor C1, a resistor R10 and a diode D4, to the base of the transistor TR2. The resistor R10 and diode D4 are connected, via a diode D5, to the ground terminal ST. The diode D5 is provided in such a way as to be reverse-biased to the power source 1.

A differentiating circuit 34 includes the resistor R7, the capacitor C1 and resistor R10. When a current is supplied via this differentiating circuit 34 to the base of the transistor TR2, power supply to the base of the transistor TR2 is cut off after a predetermined time (about 3 seconds in this embodiment) due to the capacitor C1. When the transistor TR4 is later turned on, both ends of the capacitor C1 are rendered conductive via the transistor TR4, diode D5 and resistor R10, thus forming a closed loop for discharging the capacitor C1, and for resetting the differentiating circuit 34 to its initial state.

A transistor TR5 and a series circuit of resistors R11 and R12 and a capacitor C2 are connected in parallel to the motor 3. The transistor TR5 has its collector and emitter connected to the respective ends of the motors 3. A node N16 between the resistors R11 and R12 is connected to the base of the transistor TR5. The resistors R11 and R12, the capacitor C2 and the transistor TR5 form a part of a braking circuit 35.

When the motor 3 is operational with the transistor TR2 turned on, the potential at the node N16 will not rise because the potential of the collector of the transistor TR2 is low, and the transistor TR5 is therefore turned off. When the transistor TR2 is turned off, the capacitor C2 starts charging, and the potential of the base of the transistor TR5 rises accordingly and causes the transistor TR5 to be turned on. When the transistor TR5 is turned on, it allows a circulation current Ia to flow and to cause the motor 3 to rotate in the reverse direction. The motor 3 tends to keep rotating under its own inertia, even after the transistor TR2 has been turned off.

Thus, when the motor 3 is rotating under its own inertia, it acts as a quasi-generator and generates the current Ia. This current Ia has the tendency to cause the motor 3 to rotate in an opposite direction to that caused by the motor inertia force. The motor 3 therefore generates its own braking force to cause the motor 3 to stop almost immediately. It is worthwhile to point out that the current Ia flows through the closed circuit formed by the motor 3 and the transistor TR5, which includes a minimal resistive component. As a result, the power loss is minimized, and the current Ia has a maximum braking effect. Consequently, when the motor 3 is disconnected from the power source 1, it stops rotating within a very short period of time. As a result, the worm wheel 16 is similarly prevented from rotating under its own inertia.

Since the motor 3 is activated when the transistor TR2 is turned on, the capacitor C2 starts charging as soon as the transistor TR2 is turned on. The base potential of the transistor TR5 start rising, which could cause the transistor TR5 to be turned on. If the transistors TR2 and TR5 were turned on simultaneously, the power source 1 could be undesirably short circuited. It is therefore an object of the present invention to prevent the short-circuiting of the power source 1. In this regard, the time constant of the RC circuit, formed by the resistors R11 and R12 and the capacitor C2, is selected so as to inhibit the transistor TR5 from being turned on when the transistor TR2 switches from the ON to the OFF state (i.e., when the position of the lock bar 11 is shifted).

The shift lock actuator 12 and its drive control circuit 2 will be now described in greater detail.

The shifting of the lock bar 11 to the unlocking position A from the locking position B will now be described. When the lock bar 11 is at the locking position B, as shown in FIG. 3, the contacts 41a and 41b do not contact the conductive plate 40, and the detector switch 10 is turned off. When the gear shift lever is shifted to the parking position, the parking switch 8 is turned on. When the ignition switch 4 and brake switch 6 are turned on, the transistor TR1 is turned on.

When the transistor TR1 is turned on, the emitter potential of the transistor TR1 rises, and permits a current to flow into the base of the transistor TR2, via the resistor R6 and diode D3, and causes the transistor TR2 to be switched on. Consequently, the motor 3 rotates and drives the worm wheel 16 clockwise.

The second pin 28 of the lock bar 11 always abuts on the inner peripheral surface 18 due to the action of the torsional spring 33. When the positioning cam 17 rotates with the rotation of the worm wheel 16, the second pin 28 is pushed forward by the distance P, by the inner peripheral surface 18.

As a result, the lock bar 11 moves in a parallel direction against the torsional spring 33, along the recesses 26 and 29, where the guide pin 25 and the first pin 27 are engaged, so that the lock bar 11 is shifted to the unlocking position A from the locking position B. Since both contacts 41a and 41b do not contact the conductive plate 40 even with the rotation of the worm wheel 16, the detector switch 10 remains turned off.

When the worm wheel 16 rotates 180° from the state shown in FIG. 3, the second pin 28 enters the recess 20 as shown in FIG. 4. When the lock bar 11 is shifted to the unlocking position A, the contacts 41a and 41b contact the conductive plate 40, and turn the detector switch 10 and the transistor TR3 on. This causes the current flowing from the emitter of the transistor TR1 to the base of the transistor TR2, to leak, thus turning the transistor TR2 off.

As the transistor TR2 is turned off, the power supply to the motor 3 is cut off, and the worm wheel 16 is prevented from rotating. In addition, the off-state of the transistor TR2 charges the capacitor C2, and increases the base potential of the transistor TR5. Consequently, the transistor TR5 is turned on, and the circulation current Ia flows through the motor 3. Since the circulation current Ia tends to rotate the motor 3 in the reverse direction, braking is applied to the forward inertial rotation of the motor 3. This stops the inertial rotation of the worm wheel 16, and allows the lock bar 11 to be securely set at the unlocking position A. The above operational sequence to shift the lock bar 11 to the unlocking position A from the lock position B is completed in about 0.3 sec.

As the second pin 28 is positioned in the recess 20, the bar 11 is prevented from sliding. As a result, the gear shift lever can be moved from the parking position to different position.

The shifting of the lock bar 11 to the locking position B from the unlocking position A will now be described. With the lock bar 11 positioned in the unlocking position A, as shown in FIG. 4, the contacts 41a and 41b contact the conductive plate 40 and the detector switch 10 is turned on. When the gear shift lever is shifted to the parking position, the parking switch 8 is turned on. When at least one of the ignition switch 4 or brake switch 6 is turned off, the transistor TR1 is turned off. The current stops flowing into the base of the transistor TR4 from the emitter of the transistor TR1, and the transistor TR4 is turned off.

When the transistor TR4 is turned off, the current flowing in the transistor TR4 via the detector switch 10 and the resistor R7, flows into the base of the transistor TR2 via the capacitor C1, the resistor R10 and the diode D4. The differentiating circuit 34, which includes the resistor R7, the capacitor C1 and the resistor R10, then causes a current to flow into the base of the transistor TR2 for about 3 seconds.

When the transistor TR2 is turned on for 3 seconds, the motor 3 is allowed to run for only 3 seconds. As a result, the worm wheel 16 rotates clockwise as previously described. When the recess 20, which is part of the positioning cam 17, rotates with the worm wheel 16, the second pin 28 is pushed backward by the distance P by the action of the torsional spring 33 against the inner peripheral surface 18. The movement of the second pin 28 is guided by the curved outer peripheral surface 21. The lock bar 11 is therefore shifted to the locking position B from the unlocking position A along the recesses 26 and 29. During the shifting of the lock bar 11, the contacts 41a and 41b contact the conductive plate 40, and the detector switch 10 is turned on.

Although the differentiating circuit 34 tends to cause the current to flow into the base of the transistor TR2 for about 3 seconds, the shifting of the lock bar 11 from the unlocking position A to the locking position B is completed in about 0.3 seconds. When the lock bar 11 is positioned in the locking position B, the contacts 41a and 41b do not contact the conductive plate 40, and the detector switch 10 is opened. The current supply to the base of the transistor TR2 is therefore cut off, and the transistor TR2 is turned off.

As the transistor TR2 is off, the capacitor C2 starts charging, and the base potential of the transistor TR5 increases. This turns the transistor TR5 on, and causes the circulation current Ia to flow through the motor 3. As discussed above, the circulation current Ia acts against the inertial rotation of the motor 3, and causes the worm wheel 16 to stop promptly. The lock bar 11 is therefore securely set in the locking position B, so that the gear shift lever cannot be shifted from the parking position to another position.

In conventional shift lock actuators, the forward and backward rotations of the motor is controlled so as to lock or unlock the gear shift lever. In order to drive control circuit for regulating the rotation of the motor, could normally require at least four transistors so as to form to form a bridge circuit. This increases in the quantity of the transistors undesirably complicates, and enlarges the size of the drive control circuit.

However, according to the present embodiment, the motor 3 does not to rotate in the reverse direction, and therefore only the rotation in the same direction should be controlled. Consequently, it is now possible to reduce the number of transistors in the drive control circuit 2, and to render the drive control circuit 2 simpler and more compact than conventional control circuits.

In conventional bridge circuits, two transistors are connected in series to the motor, and cause a corresponding voltage drop. This increases the power consumption of the drive control circuit, and makes it difficult to effectively use the power supply.

According to the present embodiment, however, only one transistor TR2 is connected in series to the motor 3, so that the voltage drop can be reduced to a minimum level, and additional voltage can be distributed to the motor 3 from the power source 1.

In conventional applications, when the transistor TR2 is turned on and the motor 3 is operational, the lock bar 11 could be shifted from the unlocking position A to the locking position B. In certain instances, the motor 3 may be prevented from rotating, and the contacts 41a and 41b contact the conductive plate 40 and become conductive. Consequently, the detector switch 10 remains turned on, and the power supply might be connected to the motor 3 during the shifting of the lock bar 11. This increases the consumption of the power supply, and causes the battery to drain prematurely. This added power consumption will become increasingly important as solar or other electrically operated vehicles emerge and become increasingly popular.

According to the present embodiment, no current is permitted to flow into the base of the transistor TR2 by the differentiating circuit 34, beyond a predetermined period of time (3 seconds). Even when the motor 3 is jammed or prevented from turning, the motor 3 is automatically stopped, thus preventing the power source 1 from draining.

When the ignition switch 4 and the brake switch 6 are turned on, and the parking switch 8 is also turned on, a positive surge from another motor (different from the motor 3) which is connected to the power source 1, may be applied between the collector and emitter of the transistor TR1. To protect the transistor TR1 against this surge, conventional actuators use either a resistor and a capacitor to smoothen the surge voltage, or preselect the transistor TR1 to endure the surge voltage. The first measure of smoothing the surge voltage is disadvantageous because the transfer of an input signal is inevitably delayed by the time constants of the resistor and capacitor used in the circuit. On the other hand, the use of a transistor with a high breakdown voltage narrows the selection range of transistors and increases the cost.

According to the present embodiment, however, the resistor R3 connects the node between the diode D1 and the resistor R1 to the node between the diode D2 and resistor R2. When the positive surge from another motor is applied via the diode D1 between the collector and emitter of the transistor TR1, the transistor TR1 is self biased and is turned on. The transistor TR1 will not therefore be damaged by such a positive surge in potential. Furthermore, this control circuit 2 is provided with the resistor R4 in addition to the resistor R3. The positive surge voltage applied to the transistor TR1 is therefore divided by the resistors R3 and R4, thus allowing the voltage corresponding to the resistor R4 to be applied to the base of the transistor TR1. Consequently, the resistor R4 serves to prevent an excessive voltage from being applied to the base of the transistor TR1, and to protect the transistor TR1.

As a result, a TR1 transistor with a relative low breakdown voltage can be selected, thus widening the selection range of transistors and reducing the contributing cost of the circuit. In addition, unlike conventional circuits, since the resistor R3 is used to protect the transistor TR1, the transfer of an input signal will not be delayed.

To protect the transistor TR1 against the surge voltage, the resistor R3 may be replaced by a Zener diode provided in a reverse-bias manner between the base and collector of the transistor TR1.

If the drive control circuit 2 did not include the foregoing braking circuit 35, the motor 3 would tend to rotate under its own inertia and the worm wheel 16 also rotates under its own inertia, thus rending it difficult to accurately set the lock bar 11 in the locking position B or unlocking position A. The braking circuit 35 of this embodiment can however turn on the transistor TR5 when the transistor TR2 is turned off, and permit the circulation current Ia to flow through the motor 3. This inhibits the inertial rotation of the motor 3 and swiftly stops the motor 3. The lock bar 11 can therefore be settled in the locking position B or unlocking position A accurately and without any significant delay.

Figure 7:
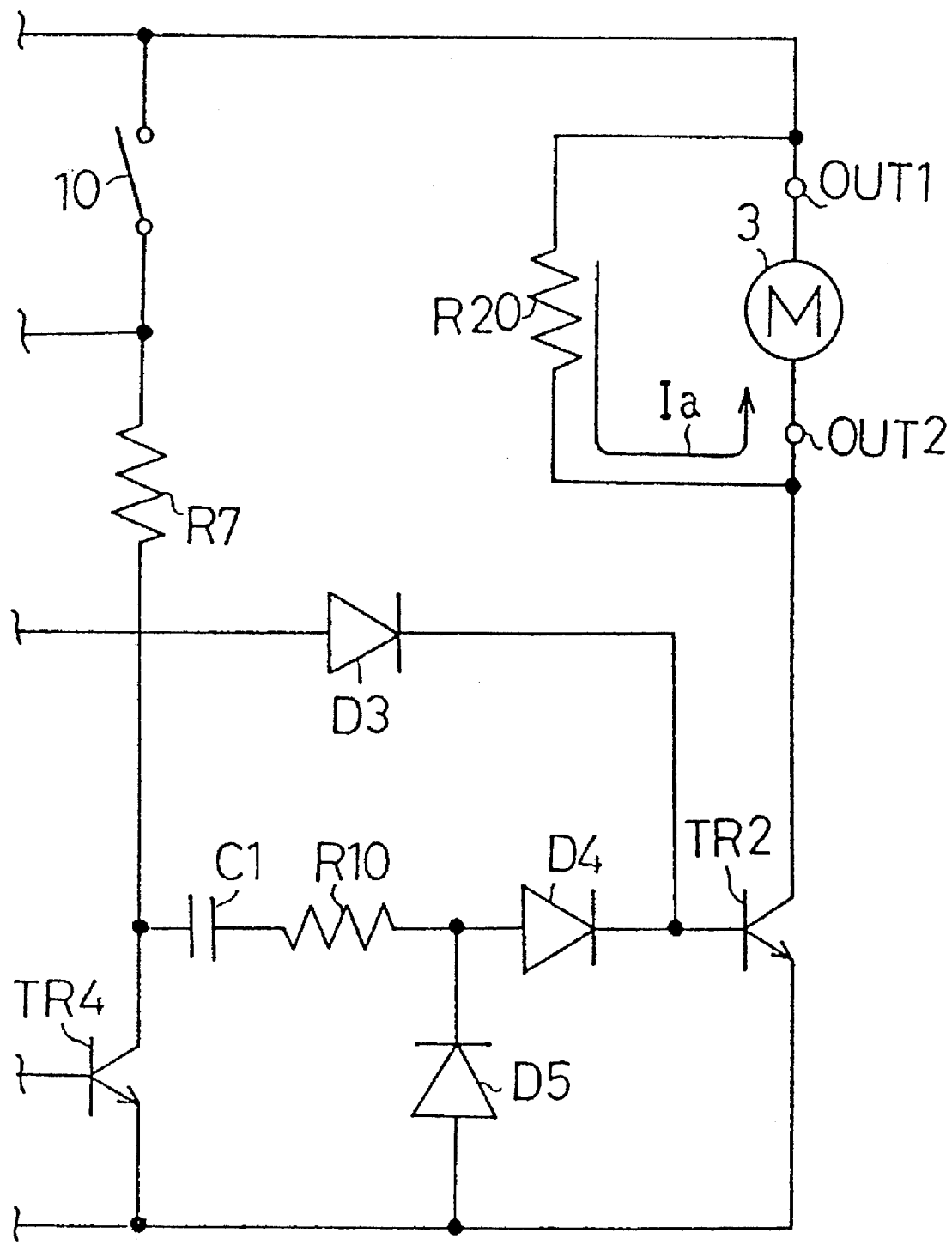

A resistor R20 may be connected in parallel to the motor 3 as shown in FIG. 7, instead of the braking circuit 35. In this design, the circulation current Ia flows to the motor 3 via the resistor R20.

Figure 8:
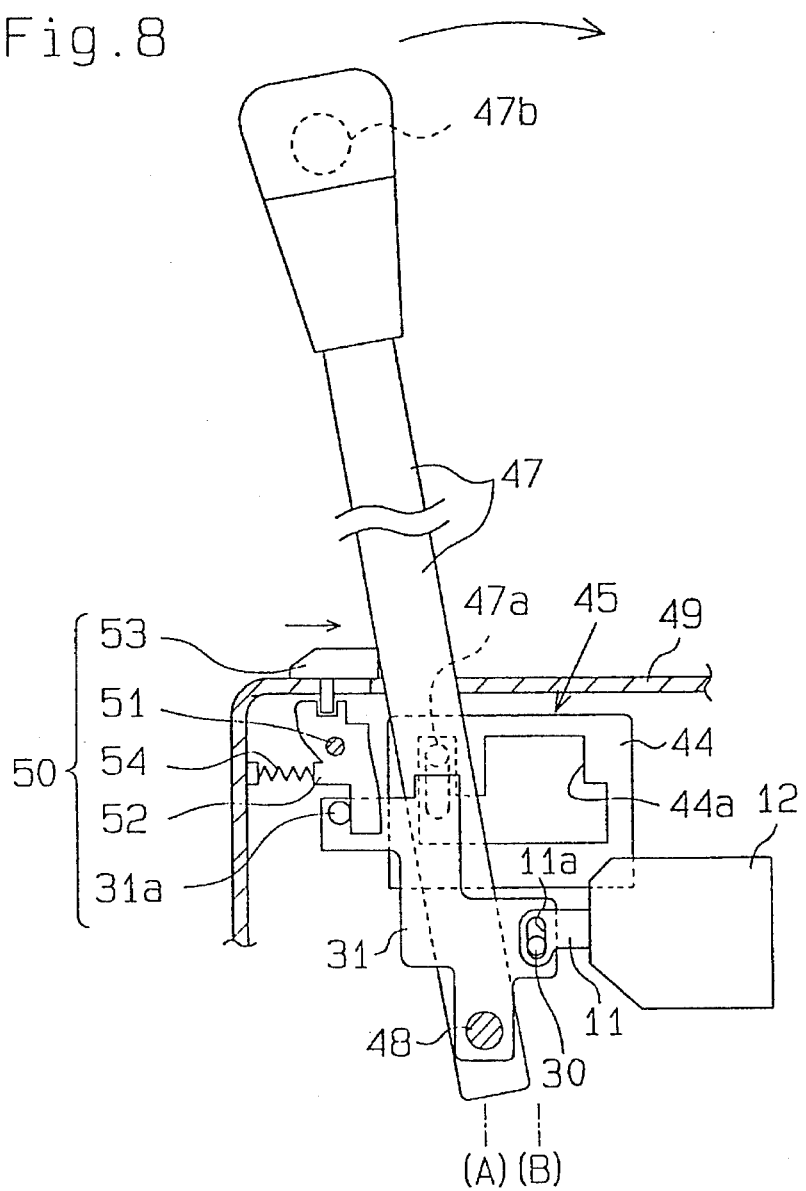

An example of the shift lock actuator 12 of the present embodiment applied to a locking mechanism 45 of an automatic vehicle will be now described referring to FIG. 8. A shift box 49 is provided with a gear shift lever 47 which is pivotable on a pivot 48. The gear shift lever 47 has a slidable lock pin 47a which is always urged outwardly by a spring (not shown) provided in the gear shift lever. The lock pin 47a is pushed downwardly when the driver presses a release button 47b. The shift box 49 is provided with a stepped plate 44 having a shift positioning aperture 44a in which the lock pin 47a penetrates.

The lock lever 31 is pivotally supported by on the pivot 48. The lock bar 11 is connected to the lock lever 31 by a connector pin 30 fitted into distal opening 11a. As shown in FIG. 8, with the lock bar 11 located in the locking position B, the lock lever 31 prevents the gear shift lever 47 from being shifted to a different position, when the lock pin 47a of the gear shift lever 47 located in the parking position is pressed down. With the lock bar 11 located in the unlocking position A, the lock pin 47a can be pressed down without interference from the lock lever 31, thus allowing the gear shift lever 47 to be shifted to another position.

The locking mechanism 45 is additionally provided with an unlocking mechanism 50. The unlocking mechanism 50 includes an emergency release lever 52 which is pivotally supported by the pivot 51. An emergency knob 53 is provided on the box 49 for manipulating the emergency release lever 52. A spring 54 forces the release lever 52 in one rotational direction. The emergency release lever 52 engages a pin 31a protruding from the locking lever 31. The emergency release lever 52 rotates counterclockwise around the pivot 51 according to the manipulation of the emergency knob 53, and the locking lever 31 also rotates with the rotation of the lever 52. After the lock lever 31 rotates, the emergency release lever 52 and the emergency knob 53 are returned to their original positions by the action of the spring 54.

When a vehicle is parked, the gear shift lever 47 is locked in the parking position by the engagement of the lock pin 47a with the stepped plate 44. With the lock bar 11 in the locking position B, even when the release button 47b is pressed, the lock pin 47a is not pressed due to the lock lever 31. When the brake pedal is pressed down to start the engine, the actuator 12 is activated and shifts the lock bar 11 to the unlocking position A from the locking position B. Consequently, the lock lever 31 is rotated forward, for permitting the lock pin 47a to be pressed down. The gear shift lever 47 therefore becomes shiftable from the parking position to another position, such as the neutral position or drive position. With the gear shift lever 47 set in the parking position when the driver removes his or her foot off the brake pedal, the lock bar 11 is returned to the locking position B. The lock lever 31 is rotated backward for inhibiting the locking pin 47a from being pressed down.

Even if the lock state of the gear shift lever 47 could not be automatically released due to a malfunction of the shift lock actuator 12 or some other reasons, the gear shift lever 47 can be manually unlocked by operating the emergency knob 53. The present design of the flat outer peripheral surface 23 of the cam portion 22, as shown in FIG. 3, the cam portion 22 does not interfere with the shifting of the lock bar 11 to the unlocking position A from the locking position B by an external force. When the emergency release lever 52 is rotated clockwise by the emergency knob 53, the lock lever 31 and the lock bar 11 are forcibly shifted to the unlocking position from the locking position against the action of the spring 33. The cam profile or outline design allows the gear shift lever 47 to be released and to because unlocked.

[Second Embodiment]

Figure 9:
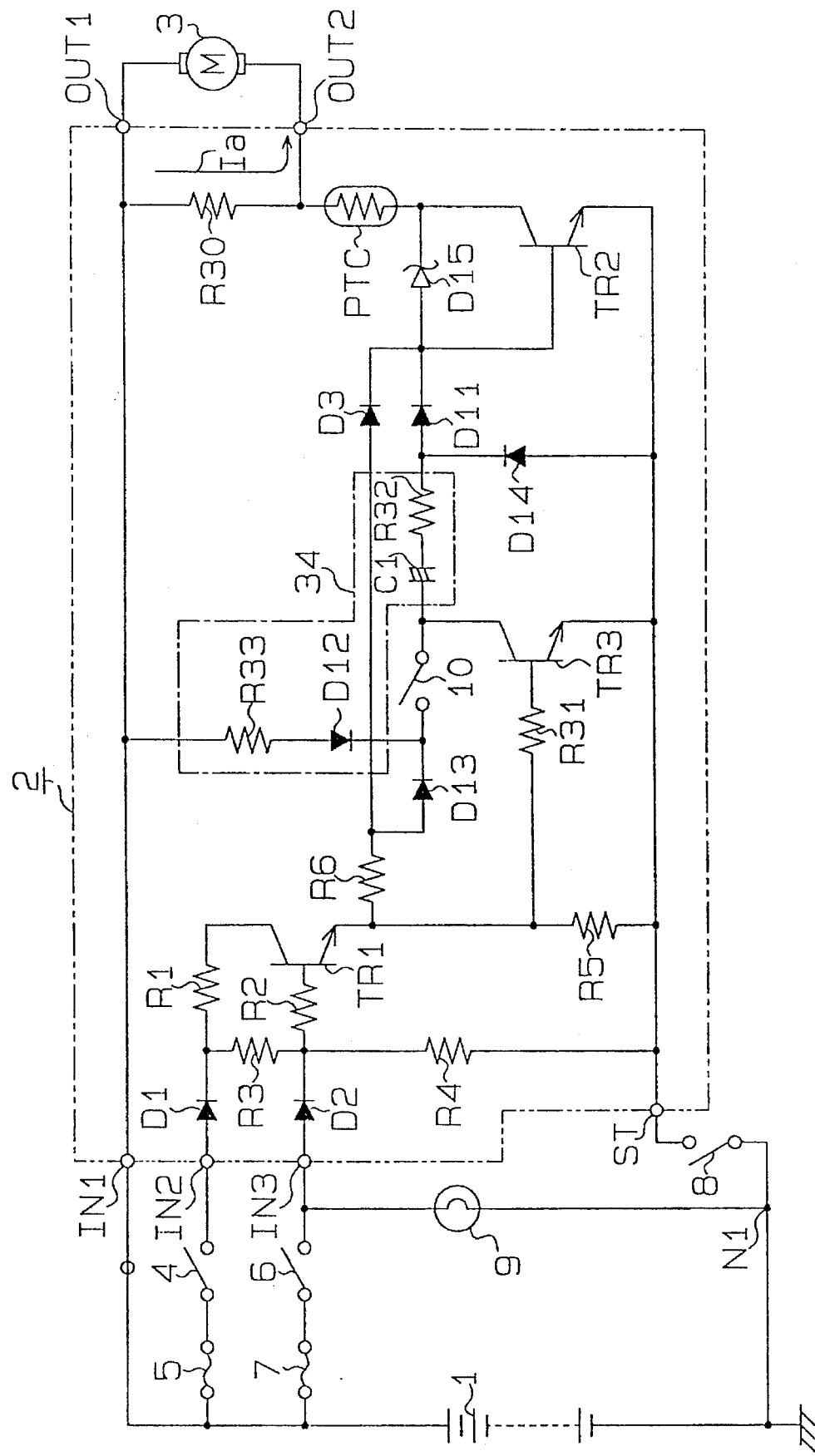
Figure 10:
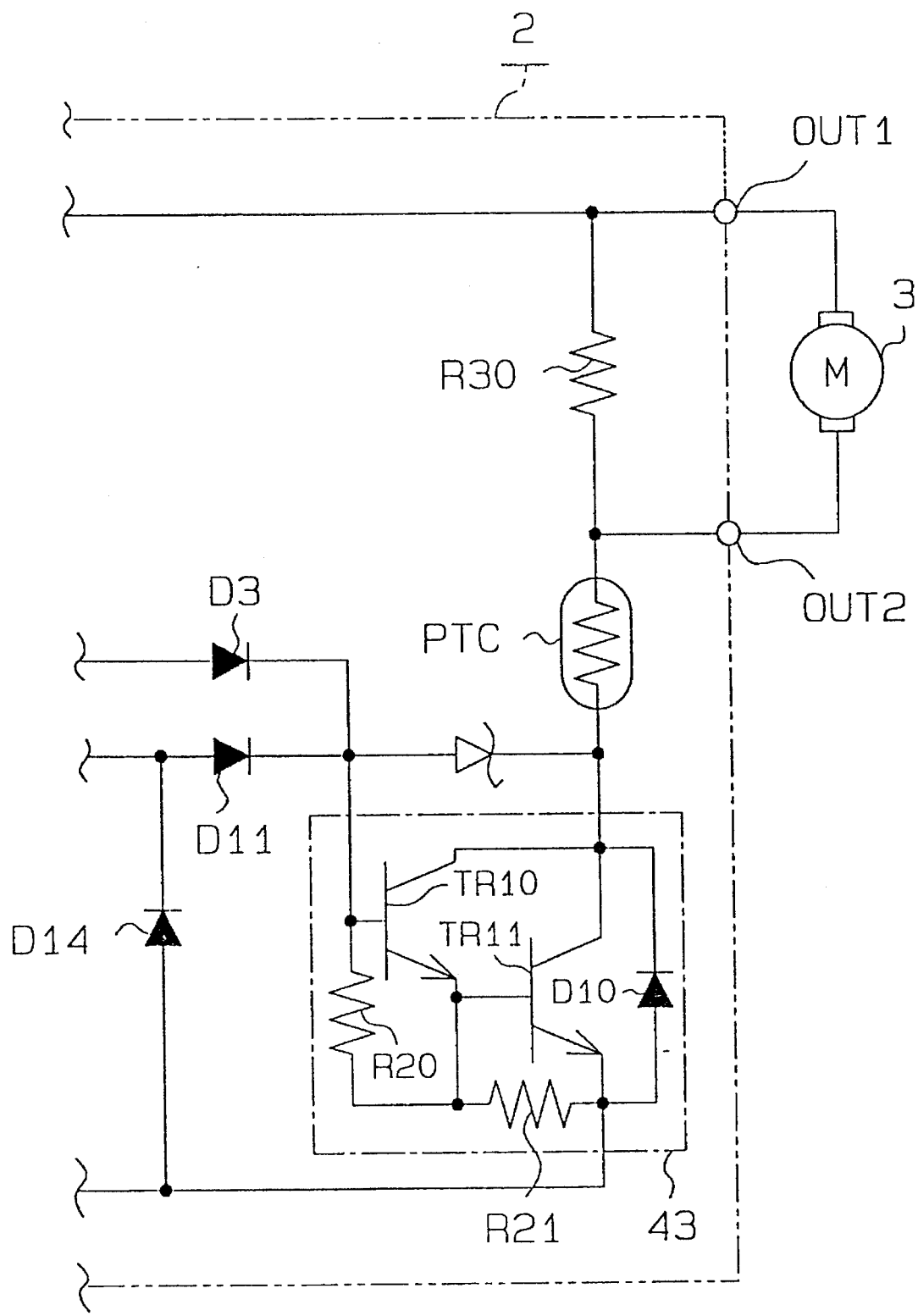

The second embodiment will now be described in greater detail. With reference to FIGS. 9 and 10. As the mechanical structure of the actuator 12 is substantially the same as that of the first embodiment, it will not be described below. The drive control circuit 2 for controlling the motor 3 of the actuator 12 will now be described, and distinguished over the first embodiment.

As shown in FIG. 9, the output terminal OUT2 is connected via a thermistor PTC and the transistor TR2 to the ground terminal ST. The transistor TR1 has its emitter connected via the resistor R6 and diode D3 to the base of the transistor TR2. The resistor R6 and the diode D3 are connected to the base of the transistor TR2 via a diode D13, the detector switch 10, the capacitor C1, a resistor R32 and a diode D11. The common terminal between the resistor R32 and the diode D11 is connected to the ground terminal ST, via a diode D14 which is reverse-biased with respect the power source 1.

The emitter of the transistor TR1 is connected via a resistor R31 to the base of the transistor TR3. The transistor TR3 has its collector connected to the detector switch 10 and capacitor C1, and its emitter connected to the ground terminal ST. Further, the input terminal IN1 is connected via a resistor R33 and a diode D12 to the common terminal between the diode D13 and detector switch 10. In this embodiment, the resistor R33, diode D12, the capacitor C1 and the resistor R32 are included in the differentiating circuit 34.

When a current is supplied via this differentiating circuit 34 to the base of the transistor TR2, the current supply to the base of the transistor TR2 is cut off after a predetermined period of time (3 seconds in this embodiment) has elapsed, by the action of the capacitor C1. When the transistor TR3 is turned on later, the capacitor C1 forms a closed lop circuit with the transistor TR3, the diode D14 and the resistor R32, for causing the capacitor C1 to be discharged, and the differentiating circuit 34 to be reset to its initial state.

A resistor R30 is connected in parallel to the motor 3. When the transistor TR2 is turned off, the circulation current Ia flows through the resistor R30, and applies a braking force to the motor 3. A Zener diode D15 is provided between the base and the collector of the transistor TR2, in a reverse-bias manner to the power source 1, to protect the transistor TR2 against surge voltages.

The operation of the drive control circuit 2 will now be discussed, beginning with the description of shifting of the lock bar 11 to the unlocking position A, as shown in FIG. 4, from the locking position B, as shown in FIG. 3.

When the lock bar 11 is in the locking position B, the detector switch 10 shown in FIG. 9 is turned off. When the gear shift lever is shifted to the parking position, the parking switch 8 is turned on. When the ignition switch 4 and brake switch 6 are further turned on, the transistor TR1 is turned on.

As the emitter potential of the transistor TR1 rises, a current flows, via the resistor R6 and diode D3, to the base of the transistor TR2, and a current flows, via the resistor R31, to the base of the transistor TR3. As a result, the base potentials of both transistors TR2 and TR3 rise.

At this time, the base potential of the transistor TR2 rises later than the base potential of the transistor TR3, due to the voltage drop caused by the diode D3. The transistor TR3 is thus turned on earlier than the transistor TR2. Accordingly, the transistor TR3 reaches a standby state to permit the collector current to flow while no current flows into the collector.

When power is supplied to the motor 3 by turning the transistor TR2 on, the worm wheel 16 rotates 180° clockwise from the state shown in FIG. 3, and shifts the lock bar 11 to the unlocking position A from the locking position B. When the contacts 41a and 41b contact the conductive plate 40 the detector switch 10 is opened or switched from the OFF state to the ON state. The current flowing into the base of the transistor TR2, via the resistor R6 and diode D3 from the transistor TR1, leaks via the diode D13 and detector switch 10, into the transistor TR3 which is already in a standby state. As a result, the transistor TR2 is turned off. The current flowing across the resistor R33 and diode D12 leaks into the transistor TR3, when the detector switch 10 is set on, so that the transistor TR2 will not be turned on.

The turning off of the transistor TR2 cuts off the power supply to the motor 3, and causes the circulation current Ia to flow through the resistor R30. Accordingly, braking is almost instantaneously applied to the motor 3, to promptly stop the rotation of the worm wheel 16. The lock bar 11 is securely settled in the unlocking position A.

The shifting of the lock bar 11 to the locking position B from the unlocking position A will now be described. With the lock bar 11 positioned in the unlocking position A, the detector switch 10 turned on. When the gear shift lever is in the parking position, the parking switch 8 is turned on. When at least one of the ignition switch 4 and brake switch 6 is turned off, the transistor TR1 is turned off. The current flowing into the base of the transistor TR3 from the transistor TR1 is cut off, thus turning the transistor TR3 off.

When the transistor TR3 is turned off, the current flowing across the resistor R33, the diode D12 and the detector switch 10 also flows into the base of the transistor TR2 via the capacitor C1, the resistor R32 and the diode D11. As a result, the differentiating circuit 34 including the capacitor C1, causes a current to flow into the base of the transistor TR2, for about 3 seconds.

When the transistor TR2 is turned on, the motor 3 runs for as long as 3 seconds. As a result, the worm wheel 16 rotates clockwise as described above, and the lock bar 11 is shifted to the locking position B from the unlocking position A. The shifting of the lock bar 11 is completed in about 0.3 seconds. When the shifting is completed, the detector switch 10 is opened or turned off. Although the differentiating circuit 34 tries to supply a current to the base of the transistor TR2 for about 3 seconds, the current supply to the base of the transistor TR2 is cut off, and the transistor TR2 is turned off.

As the transistor TR2 is turned off, the power supply to the motor 3 is cut off and the circulation current Ia flows across the resistor R30. Braking is immediately applied to the motor 3, promptly stop the rotation of the worm wheel 16. Consequently, the locking action of the lock lever 31 inhibits the gear shift lever from shifting from the parking position to another position.

According to the second embodiment, the transistor TR3 can be set in a standby state before the transistor TR2. When the detector switch 10 is turned on, the current flowing via the resistor R6 and the diode D3 toward the transistor TR2, and the current flowing via the resistor R33, the diode D12 and the detector switch 10, toward the transistor TR2, can leak through the transistor TR3. As a result, the transistor TR2 is turned off, and the lock bar 11 is securely settled in the unlocking position A.

In addition, there is no voltage-dropping diode, which corresponds to the diode D11 of the transistor TR2, that is connected to the base of the transistor TR3. Even if the emitter potential of the transistor TR1 slightly varies (or drops) due to variation of an input signal (e.g., the battery voltage) to the drive control circuit 2, the transistor TR3 will not be turned off. The ON/OFF control of the transistor TR2 can therefore be stabilized regardless of variations in the input signal.

The stabilization of the ON/OFF control of the transistor TR2 can set the stop position of the lock bar 11 more accurately. According to the second embodiment, the drive control circuit 2 includes fewer components, thus contributes to the reduction in the size and manufacture cost of the shift lock actuator.

According to this embodiment, the transistor TR2 may be replaced with a Darlington circuit 43, which comprises two transistors TR10 and TR11, two resistors R20 and R21 and a diode D10 for protecting the transistor TR11, as shown in FIG. 10. The Darlington circuit 43 has a higher amplification factor than the single transistor TR2, so that the use of the Darlington circuit 43 as a switching device stabilizes the ON/OFF operation of the switching means for the motor 3.

[Third Embodiment]

Figure 11:
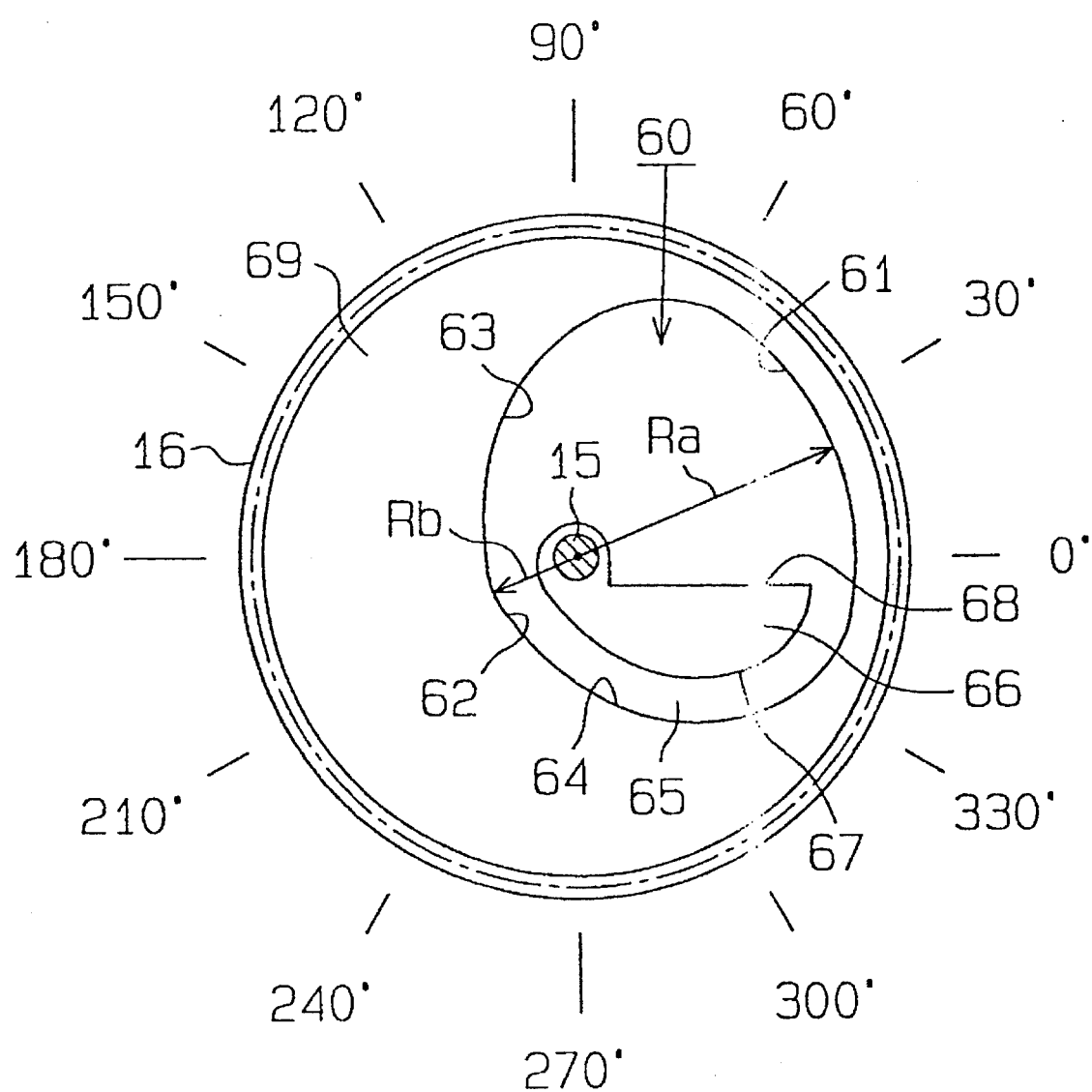

The third embodiment of the present invention will now be described referring to FIGS. 11 through 14. In this embodiment, the profile of the cam formed on the worm wheel 16 is particularly designed so as to accurately set the lock bar 11 in the unlocking position A or the locking position B, even when the stop position of the worm wheel 16 is shifted off its proper position. FIG. 11 illustrates the profile or outline design of a cam 60 formed on one side of the worm wheel 16 by a disc portion 69 and a cam portion 66 together with angle graduations graduated counter clockwise.

As shown in FIG. 11, the disc portion 69 of the cam 60 has a first inner surface 61 formed along an arc of a radius Ra around the support shaft 15, in a region of about 75° ranging from 345° to 60°. A second inner surface 62 is formed along an arc of a radius Rb, around the support shaft 15, in a region of about 45° ranging from 180° to 225°. A third and fourth inner surfaces 63 and 64 are formed along arbitrary arcs or straight lines connecting both inner surfaces 61 and 62 in the remaining regions.

The cam portion 66 of the cam 60 has a curved outer surface 67 which faces parts of the first and second inner surfaces 61 and 62, and the fourth inner surface 64 at predetermined gaps in the region from 180° to 0°. A grooved recess 65 is formed between a curved outer surface 67 and those inner surfaces which face the curved outer surface 67. The movement of the second pin 28 of the lock bar 11 along the grooved recess 65, guides the lock bar 11 to the locking position B from the unlocking position A.

The cam portion 66 further has a flat outer surface 68 which is formed on the opposite side of the curved outer surface 67. This flat outer surface 68 is offset with respect to a plan passing through the geometrical center of the support shift 15, by the diameter of the second pin 28. The cam 60 is positioned to have a phase shown in FIG. 12 or FIG. 13, with respect to the lock bar 11 in the locking position or the unlocking position, as previously described with regard to the first embodiment.

As the structure of the actuator is substantially the same as that of the first embodiment, with the exception of the profile of the cam 60, the following description will only emphasize the novel and distinctive features of the third embodiment.

Figure 12:
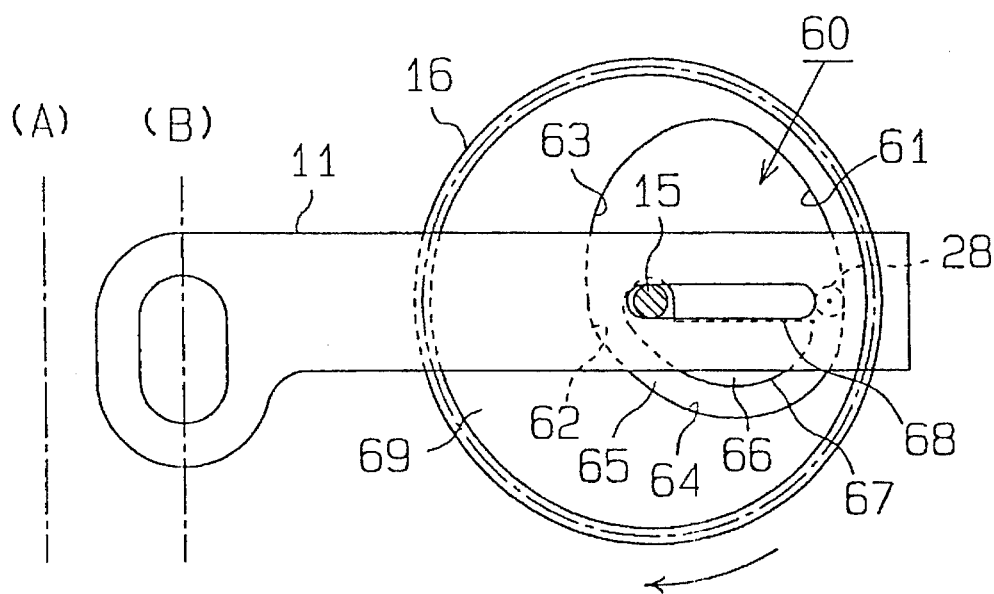

In the locking state shown in FIG. 12, the second pin 28 of the lock bar 11 is forced by the forsional spring 33 against the first inner-surface 61. The first inner surface 61 is formed along an arc, around the support shaft 15. Even if the worm wheel 16 were stopped short of its proper position, the lock bar 11 will not move as long as the second pin 28 abuts the first inner surface 61.

Figure 13:
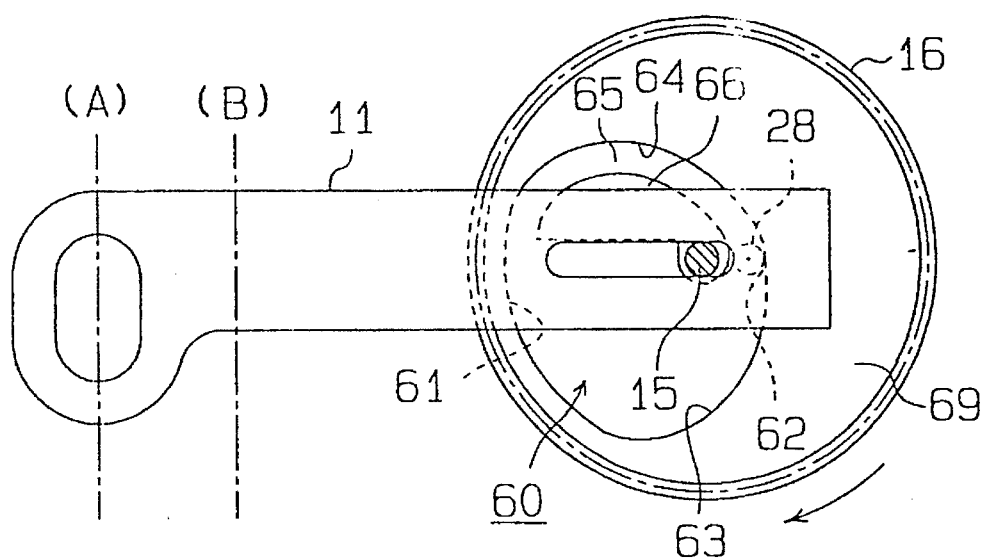

In the unlocking state shown in FIG. 13, the second pin 28 of the lock bar 11 abuts the second inner surface 62. The second inner surface 62 is also formed along an arc around the support shaft 15. Even if the worm wheel 16 were stopped short of its proper position, the lock bar 11 will not move as long as the second pin 28 abuts the second inner surface 62. The lock bar 11 is therefore held in the locking position B or the unlocking position A, even if the worm wheel 16 were not stopped in the right position.

Figure 14:
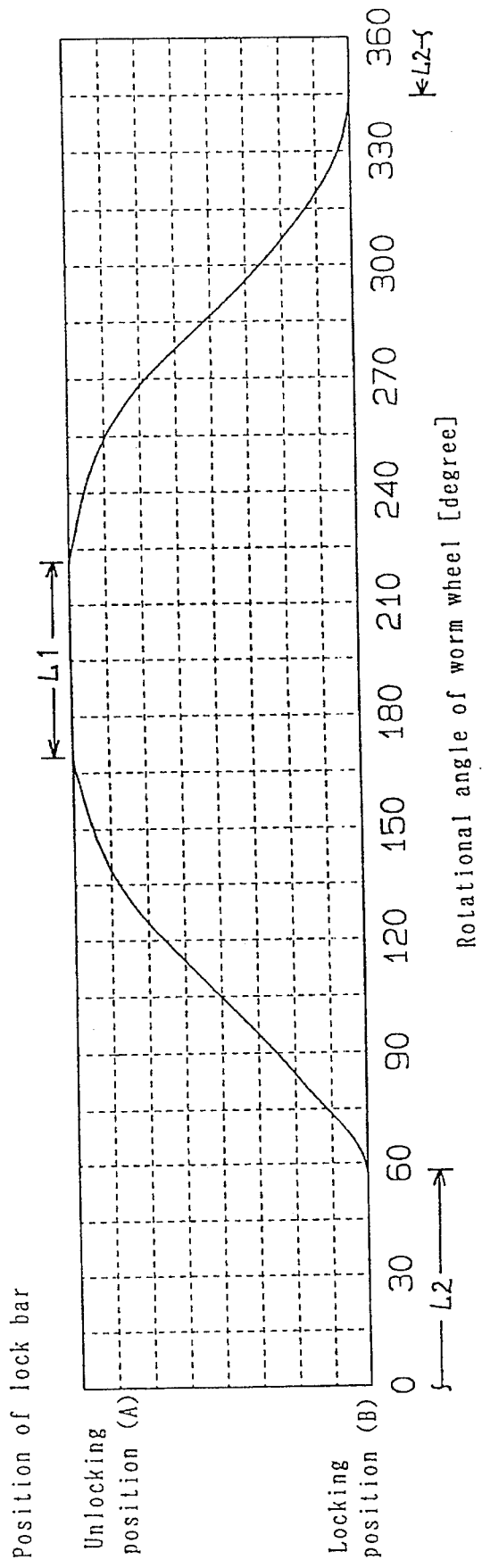

FIG. 14 illustrates the relationship between the rotational angle of the worm wheel 16 and the position of the lock bar 11. It is apparent from FIG. 14 that the cam 60 is designed in such a way as to provide a region L1, where the lock bar 11 is held in the unlocking position A, regardless of the rotation of the worm wheel 16, and a region L2 where the lock bar 11 is held in the locking position B, also regardless of the rotation of the worm wheel 16. According to this embodiment, the profile of the cam 60 is set so that the region L2 becomes wider than the region L1. This is because the accurate positioning to the locking position B is more important than the positioning to the unlocking position A.

According to the present invention, if the worm wheel 16 were stopped short of its proper position, the lock bar 11 is accurately held in the unlocking position A or the locking position B. Therefore, it would be possible in some cases not to include the braking circuit as part of the drive control circuit 2 in the first and second embodiments, to stop and position the worm wheel 16.

Although only three embodiments of the present invention have been described herein, it should be apparent to those skilled in the art that the present invention may be embodied in many other specific forms without departing from the spirit or scope of the invention.

Therefore, the present examples and embodiments are to be considered as illustrative and non restrictive, and the invention is not to be limited to the details given herein.

What is claimed is:

1. A control circuit for an actuator for a locking mechanism which locks a lever in a locked position, said lever being shiftable between the lock position and a released position, the actuator having a motor capable of rotating in a single direction, a power source connected to said motor, and a shiftable locking bar for operatively connecting said motor to said lever, the activation of said motor causing said locking bar to shift between a lock position corresponding to the lock position of said lever and an unlock position corresponding to the released position of said lever, the locking mechanism having a plurality of set switches to be turned on or off in accordance with the state of manipulating apparatuses associated with the locking mechanism, the manipulating apparatuses associated with the locking mechanism, the control circuit comprising:

a rotary switch operatively connected to said motor, and serving as a detector for detecting the location of said locking bar between the lock and unlock positions;

switch means for causing said power source to be connected to or disconnected from the motor in order to control the supply of power to said motor;

first control means, coupled to said rotary switch and said switch means, for controlling said switch means in accordance with the setting of said rotary switch as well as said set switches, so as to shift said locking bar to the unlock position from the lock position, said first control means turning said switch means off upon completion of the shifting of said locking bar to the unlock position;

second control means, coupled to said rotary switch and said switch means, for controlling said switch means for a predetermined period of time in accordance with the setting of said rotary switch as well as said set switches, so as to shift said locking bar to the lock position from the unlock position, said second control means turning said switch means off upon completion of the shifting of said locking bar to the lock position; and said rotary switch disabling the operation of said second control means when said first control means is activated, and enabling the operation of said second control means when said first control means is deactivated.

2. The control circuit according to claim 1, wherein said switch means is a transistor.

3. The control circuit according to claim 1, wherein said first control means includes a first transistor for generating a control signal to said switch means, and a second transistor connected to said first transistor, for leaking a control signal to prevent said switch means from being supplied with the control signal.

4. The control circuit according to claim 3, wherein an emitter of the first transistor is connected to a base of the second transistor.

5. The control circuit according to claim 1, wherein said second control means is formed with a differentiating circuit having a capacitor to control the period of current flow through said differentiating circuit.

6. The control circuit according to claim 1, wherein said first control means includes a first transistor for generating a control signal to said switch means, and wherein the control circuit further comprises a third transistor coupled to said second control means and having a base connected to said first transistor, said third transistor allowing said second control means to be activated when said first transistor turns off, and deactivating said second control means when said first transistor turns on.

7. The control circuit according to claim 1, further comprising a braking circuit for promptly stopping the motor when said switch means is turned off; and wherein said braking circuit is connected to the motor for allowing a current generated by the inertial rotation of the motor, to circulate therein, for generating a braking force and for stopping the inertial rotation of the motor.

8. The control circuit according to claim 7, wherein said braking circuit includes:

a transistor connected in parallel to the motor; and an RC series circuit connected in parallel to said transistor as well as the motor, said RC series circuit having one capacitor and at least one resistor for determining a base potential of said transistor, said RC series circuit having a predefined time constant which prevents said transistor from being turned on before said switch means is turned off.

9. The control circuit according to claim 7, wherein said braking circuit is formed with a single resistor connected in parallel to the motor.

10. The control circuit according to claim 3, wherein said first control means further includes a coupling element for connecting a collector and a base of said first transistor, such that, when a power surge from an external source is transmitted to said first transistor, said coupling element causes said first transistor to be switched on for protecting said first transistor from damage.

11. The control circuit according to claim 10, wherein said coupling element is a resistor.

12. The control circuit according to claim 1, wherein said set switches are an ignition switch, a brake switch, and a parking switch.

13. A controller for an actuator of a locking mechanism for controlling the movement of a lever between a locked and a released position in response to the reciprocal movement of a locking bar mounted on a disk driven by a unidirectional motor, said locking bar being reciprocated between a lock position and an unlocked position by the rotation of said disk, said controller comprising:

a rotary switch, coupled to said motor, for detecting the position of said locking bar;

a main switch, coupled to said motor, for selectively applying power to said motor;

a first control circuit, coupled to said main switch and said rotary switch, for enabling said main switch to power said motor in order to move said locking bar from the lock position to the unlock position, said first control circuit including a first transistor to output a control signal to said main switch, and a second transistor connected to said first transistor and to said rotary switch;

a second control circuit, coupled to said main switch and said rotary switch, for enabling said main switch to power said motor in order to move said locking bar from the unlock position to the lock position, said second control circuit being formed with a differentiating circuit having a capacitor to control the period of current flow through said differentiating circuit; and said rotary switch disabling the operation of said second control circuit when said first control circuit is activated, and enabling the operation of said second control circuit when said first control circuit is deactivated.

14. The controller according to claim 13 further comprising a third transistor coupled to said differentiating circuit and having a base connected to said first transistor, said third transistor allowing said differentiating circuit to be activated when said first transistor turns off and deactivating said differentiating circuit when said first transistor turns on.

15. The controller according to claim 13, wherein said first control circuit further includes a coupling element for connecting a collector and a base of said first transistor, wherein when a power surge from an external source is transmitted to said first transistor, said coupling element causes said first transistor to be switched on, thereby protecting said first transistor from damage.

16. The controller according to claim 15, wherein said coupling element is a resistor.

17. The controller according to claim 13, wherein an emitter of said first transistor is connected to a base of said second transistor.

* * * * *